US009544723B2

(12) United States Patent
Lewis et al.

(10) Patent No.: US 9,544,723 B2
(45) Date of Patent: Jan. 10, 2017

(54) SYSTEM AND METHOD TO DISPLAY CONTENT ON AN INTERACTIVE DISPLAY SURFACE

(71) Applicant: SMART Technologies ULC, Calgary (CA)

(72) Inventors: Jeff Lewis, Calgary (CA); Min Xin, Calgary (CA); Sean Bacchus, Calgary (CA); Roberto Diaz-Marino, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 395 days.

(21) Appl. No.: 14/054,510

(22) Filed: Oct. 15, 2013

(65) Prior Publication Data

US 2014/0108544 A1   Apr. 17, 2014

Related U.S. Application Data

(60) Provisional application No. 61/714,214, filed on Oct. 15, 2012.

(51) Int. Cl.
*G06F 15/16* (2006.01)
*H04W 4/02* (2009.01)

(52) U.S. Cl.
CPC ............... *H04W 4/02* (2013.01); *H04W 4/026* (2013.01)

(58) Field of Classification Search
CPC ................................ H04W 4/02; H04W 4/026
See application file for complete search history.

(56) References Cited

U.S. PATENT DOCUMENTS

| 5,448,263 | A | 9/1995 | Martin |
| 6,141,000 | A | 10/2000 | Martin |
| 6,337,681 | B1 | 1/2002 | Martin |
| 6,747,636 | B2 | 6/2004 | Martin |
| 6,803,906 | B1 | 10/2004 | Morrison et al. |
| 7,232,986 | B2 | 6/2007 | Worthington et al. |
| 7,236,162 | B2 | 6/2007 | Morrison et al. |
| 7,274,356 | B2 | 9/2007 | Ung et al. |
| 7,660,565 | B2 * | 2/2010 | Patel ................... H04B 17/318 370/332 |
| 8,606,865 | B2 * | 12/2013 | Layson, Jr. ............ G06Q 30/02 709/206 |
| 9,043,135 | B2 * | 5/2015 | Dave ................... G01C 21/3461 340/995.15 |
| 2008/0009324 | A1 * | 1/2008 | Patel ..................... H04W 48/18 455/566 |
| 2008/0039040 | A1 * | 2/2008 | Patel ..................... H04B 17/24 455/226.2 |

* cited by examiner

*Primary Examiner* — Moustafa M Meky
(74) *Attorney, Agent, or Firm* — Perkins Coie LLP

(57) ABSTRACT

A method comprises detecting the location of a portable computing device within a collaboration system based on wireless communications between the portable computing device and a plurality of collaboration sites within the collaboration system; and displaying a map on the portable computing device that identifies the location of the portable computing device within the collaboration system and that specifies a path to a target collaboration site.

5 Claims, 18 Drawing Sheets

SYSTEM AND METHOD TO DISPLAY CONTENT ON AN INTERACTIVE DISPLAY SURFACE

CROSS-REFERENCE TO RELATED APPLICATION

This application claims the benefit of U.S. Provisional Application No. 61/714,214 to Lewis et al. filed on Oct. 15, 2012, entitled "A System and Method to Display Content on an Interactive Display Surface", the entire content of which is incorporated herein by reference.

FIELD OF THE INVENTION

The subject disclosure relates to a system and method for displaying content on an interactive display surface and to an interactive board.

BACKGROUND OF THE INVENTION

Interactive input systems that allow users to inject input (e.g., digital ink, mouse events etc.) into an application program using an active pointer (e.g., a pointer that emits light, sound, or other signal), a passive pointer (e.g., a finger, cylinder or other suitable object) or other suitable input devices such as for example, a mouse, or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the relevant portions of the disclosures of which are incorporated herein by reference; touch systems comprising touch panels employing electromagnetic, capacitive, acoustic or other technologies to register pointer input; laptop and tablet personal computers (PCs); smartphones; personal digital assistants (PDAs) and other handheld devices; and other similar devices.

Conferencing and other event management systems, such as Microsoft® Live Meeting, Citrix® GoToMeeting®, SMART Bridgit™, and the like are also known. These systems allow participants at different geographical locations to participate in a collaborative session using computing devices and share content, such as screen images, files documents, pages etc. For example, the SMART Bridgit™ version 4.2 conferencing system offered by SMART Technologies ULC comprises one or more servers and clients, and provides plug-ins for event scheduling programs, such as Microsoft Exchange® or Microsoft Outlook®. An event may be scheduled in Microsoft Outlook® via a SMART Bridgit™ plug-in on a participant's computing device, by assigning a name, a start time and an end time to the event. Using a SMART Bridgit™ client program, a user may create an event session on the SMART Bridgit™ server to start an ad-hoc event. Other participants may join the event session using the SMART Bridgit™ client program running on their computing devices by entering the event name and any required password. In addition to sharing content, participants can annotate shared screen images by injecting digital ink thereon using a computer mouse, a touch screen, or an interactive board.

While existing conferencing and event management systems are satisfactory, advances to improve the user experience are typically sought. For example, improvements to reduce the time required to set up a meeting, including the time for local participants to reach the meeting room or designated meeting place, the time for all local and remote participants to log into the meeting session and the time for meeting participants to transfer files amongst themselves, are desired.

It is therefore an object to provide a novel system and method for displaying content on an interactive display surface and a novel interactive board.

SUMMARY OF THE INVENTION

In one aspect, the subject disclosure describes a collaboration system that allows portable computing devices to be tracked as they move within a collaboration system comprising more than one collaborative sites. Visual information identifying a portable computing device within the collaboration system can be displayed thereon together with information identifying a target collaboration site for the portable computing device to facilitate movement of user of the portable computing device to the target collaboration site.

In another aspect, the subject disclosure describes a user interface for computing devices of a collaboration system to facilitate logging into meeting sessions and the sharing of information between participants of meeting sessions.

Accordingly, disclosed herein is an interactive board comprising an interactive display surface and an integrated wireless network device, said wireless network device configured to establish a wireless communication link with a proximate portable computing device and to provide portable computing device locator information to a networked device.

Also disclosed herein is a method comprising detecting the location of a portable computing device within a collaboration system based on wireless communications between the portable computing device and a plurality of collaboration sites within the collaboration system; and displaying a map on the portable computing device that identifies the location of the portable computing device within the collaboration system and that specifies a path to a target collaboration site.

BRIEF DESCRIPTION OF THE DRAWINGS

Embodiments will now be described more fully with reference to the accompanying drawings in which.

DETAILED DESCRIPTION OF THE EMBODIMENTS

Figure 1:
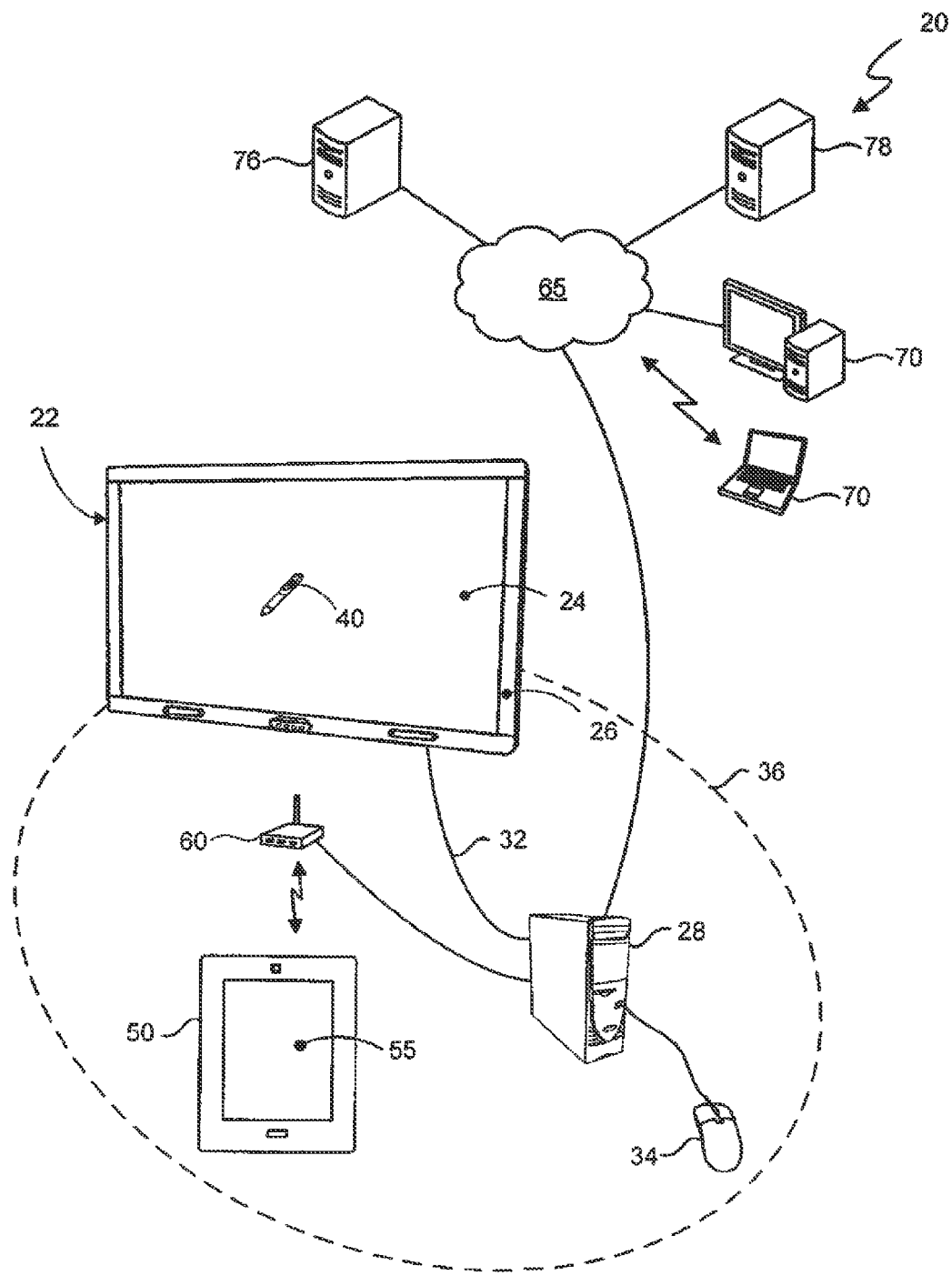
FIG. 1 is a perspective view of a collaboration system.

Turning now to FIG. 1, a collaboration system is shown and is generally identified by reference numeral 20. In this embodiment, the collaboration system 20 comprises a plurality of collaboration sites, only one of which is shown for ease of illustration. Each collaboration site is associated with a physical location such as for example, a meeting room, a classroom, a lecture theater, a hallway, etc. within a larger environment such as an office building, school, university or college building etc. As can be seen, the collaboration site comprises a collaboration computing device 28 located at the associated physical location or at a remote location. The collaboration site also comprises an interactive board 22 that is mounted on a vertical support surface at the physical location associated with the collaboration site such as a wall surface or the like, or that is otherwise supported or suspended in a generally upright orientation. The interactive board 22 is connected to the collaboration computing device 28 via a universal serial bus (USB) cable 32 or other suitable wired or wireless connection depending on the location of the collaboration computing device 28 relative to the interactive board 22. The interactive board 22 allows a user to inject input such as digital ink, mouse events etc. into an application program executed by the collaboration computing device 28. Depending on the nature of the collaboration site, the collaboration site may comprise more than one interactive board 22 connected to the collaboration computing device 28.

The interactive board 22 comprises a generally planar, rectangular interactive surface 24 that is surrounded about its periphery by a bezel 26. An image, such as for example a computer desktop is displayed on the interactive surface 24. In this embodiment, the interactive board 22 employs a liquid crystal display (LCD) panel or other suitable display device to display the image. The interactive board 22 also employs machine vision to detect one or more pointers brought into a region of interest in proximity with the interactive surface 24. In particular, imaging assemblies (not shown) are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire interactive surface 24. Of course, those of skill in the art will appreciate that the imaging assemblies may be located at different positions about the interactive surface 24. A digital signal processor (DSP) or other suitable processing device is associated with each imaging assembly and sends clock signals to its image sensor causing the image sensor to capture image frames at the desired frame rate.

The imaging assemblies are oriented so that their fields of view overlap and look generally across the entire interactive surface 24. In this manner, any pointer such as for example a user's finger, a cylinder or other suitable object, or a pen or eraser tool that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey the image frames to a master controller. The master controller in turn processes the image frames to determine the position of the pointer in (x,y) coordinates relative to the interactive surface 24 using triangulation. The pointer coordinates are then conveyed to the collaboration computing device 28, which uses the pointer coordinates to update the image displayed on the LCD panel if appropriate. In this manner, pointer activity proximate the interactive surface 24 can be recorded as writing or drawing or used to control execution of application programs running on the collaboration computing device 28.

The collaboration computing device 28 in this embodiment is a general purpose computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computing device components to the processing unit. The user may also enter input or give commands to the collaboration computing device 28 via a mouse 34 or a keyboard (not shown). Other input techniques such as voice or gesture-based commands may also be employed to allow users to interact with the collaboration computing device 28.

The collaboration computing device 28 is connected to a network 65 over either a suitable wired connection, such as an Ethernet, or a wireless connection, such as Wi-Fi, Bluetooth, etc. The network 65 may be a local area network (LAN) within an organization, a cellular network, the Internet, or a combination of different networks. A plurality of server computing devices, namely a SMART Meeting Server (SMS) 76 offered by SMART Technologies ULC and a scheduling server 78 as well as one or more participant computing devices 70 communicate with the network 65 over wireless connections, wired connections or combined wireless/wired connections. The scheduling server 78, which in this embodiment is an Exchange Server provided by Microsoft Corporation of Redmond, Wash., U.S.A., allows users to schedule meetings at the various collaboration sites of the collaboration system 20. The SMS 76 facilitates the sharing of audio, video and data information during scheduled meetings.

Each collaboration site also comprises a wireless network device 60. In this embodiment, the wireless network device 60 is a Wi-Fi network device that is integrated into the interactive board 22. The wireless network device 60 acts as a radio beacon and is used as a Wi-Fi based locator and to provide network connections for portable computing devices as will be described. The collaboration computing device 28 is configured to control the wireless network device 60 to provide a wireless network 36 at the collaboration site. One or more portable computing devices 50 positioned within the collaboration site such as for example, tablets, laptops, smartphones, personal digital assistants (PDAs), etc., may connect to the wireless network 36 via the wireless network device 60 and access the network 65 to join a meeting scheduled at the collaboration site as will be described. In this embodiment, the wireless network 36 is assigned a wireless network service set identifier (SSID) and communications via the wireless network 36 are encrypted using a security protocol, such as Wi-Fi Protected Access II (WPA2) protocol with a customizable network key.

Figure 2:
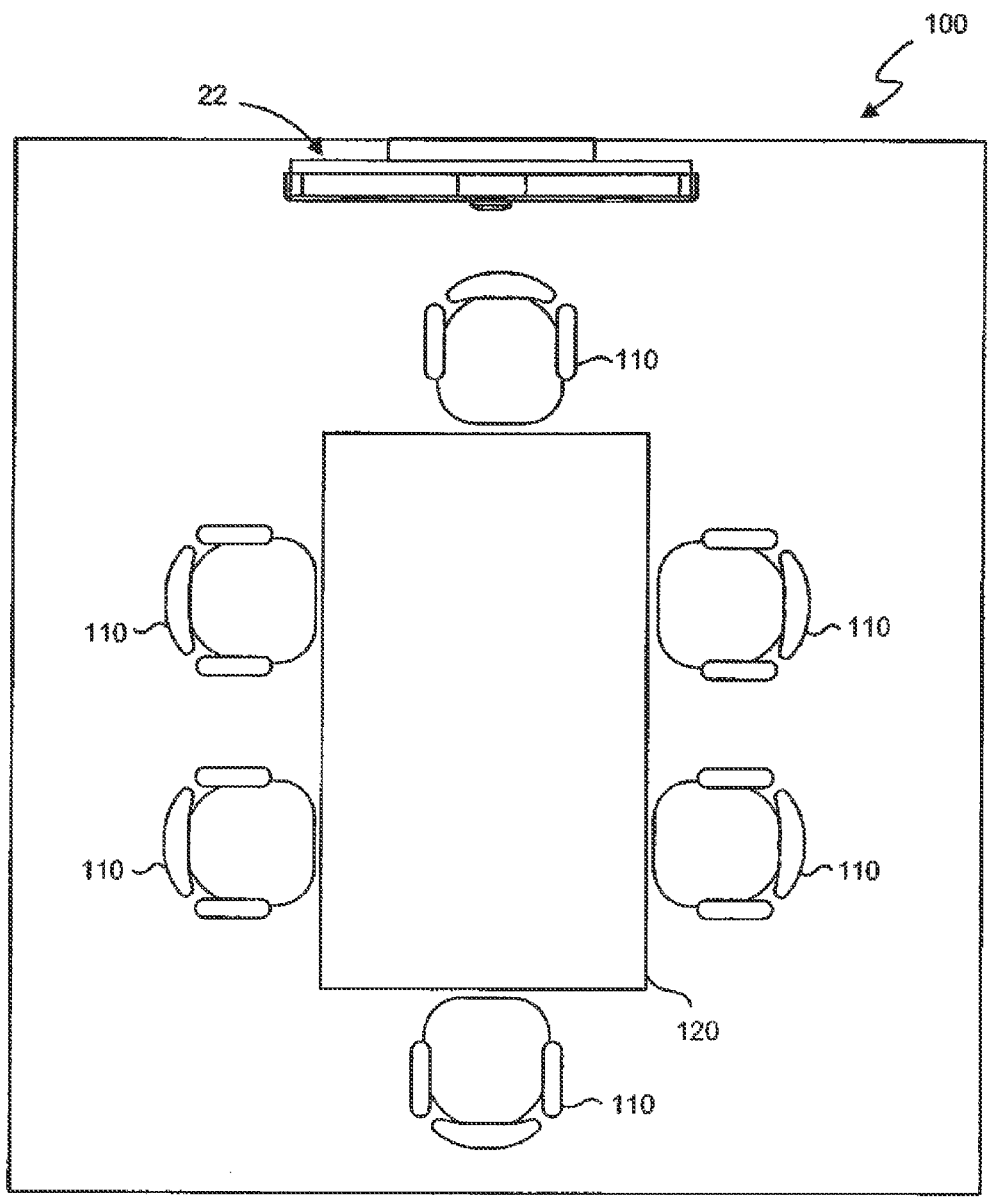
FIG. 2 is a top plan view of an exemplary collaboration site forming part of the collaboration system of FIG. 1.

FIG. 2 shows an exemplary collaboration site 100 comprising one or more fixtures 110 and 120. In this embodiment, the collaboration site 100 is a meeting room, the fixtures 110 are chairs and fixture 120 is a table. The interactive board 22 is mounted on a wall of the meeting room 100 adjacent one end of the table 120.

Turning back to FIG. 1, a single exemplary portable computing device 50 in the form of a tablet is shown for ease of illustration only. The portable computing device 50 has a Wi-Fi device therein that can detect the presence of the wireless network device 60 integrated in the interactive board 22 once the portable computing device 50 is in proximity to and within the range of the wireless network device 60. The Wi-Fi device in the portable computing device 50 and the wireless network device 60 integrated into the interactive board 22 allow the portable computing device 50 to connect to wireless network 36 via the wireless network device 60. Those of skill in the art will appreciate, that in most environments, more than one portable computing device 50 will be located within the collaboration site and connected to the wireless network 36 via the wireless network device 60. The portable computing device 50 runs meeting client software and comprises an interactive display surface 55 on which content such as documents, pictures, videos etc. is displayed. The content can be stored in its memory or streamed from a remote server (not shown) via the Internet.

In this embodiment, the meeting client software running on the portable computing device 50 comprises a navigation software program that is configured to display the current location of the portable computing device 50 within the collaboration system 20, and directions to a target collaboration site to which the user of the portable computing device 50 is destined, if appropriate.

When the portable computing device 50 has connected to the wireless network 36 via the wireless network device 60 and has accessed the network 65, the navigation software program running on the portable computing device 50 communicates orientation/direction information to the SMS 76. The SMS 76, which maintains a fingerprint dataset of the collaboration system 20 that identifies the location of each collaboration site within the collaboration system 20 and the wireless network device 60 in each collaboration site, uses the received orientation/direction information and fingerprint dataset and provides a map to the navigation software program. When the navigation software program receives the map from the SMS 76, the navigation software program displays the map on the interactive display surface 55 of the portable computing device 50 with an icon 150 identifying the current location of the portable computing device 50 and the path that the user needs to follow to arrive to the target collaboration site as will be described.

Figure 3:
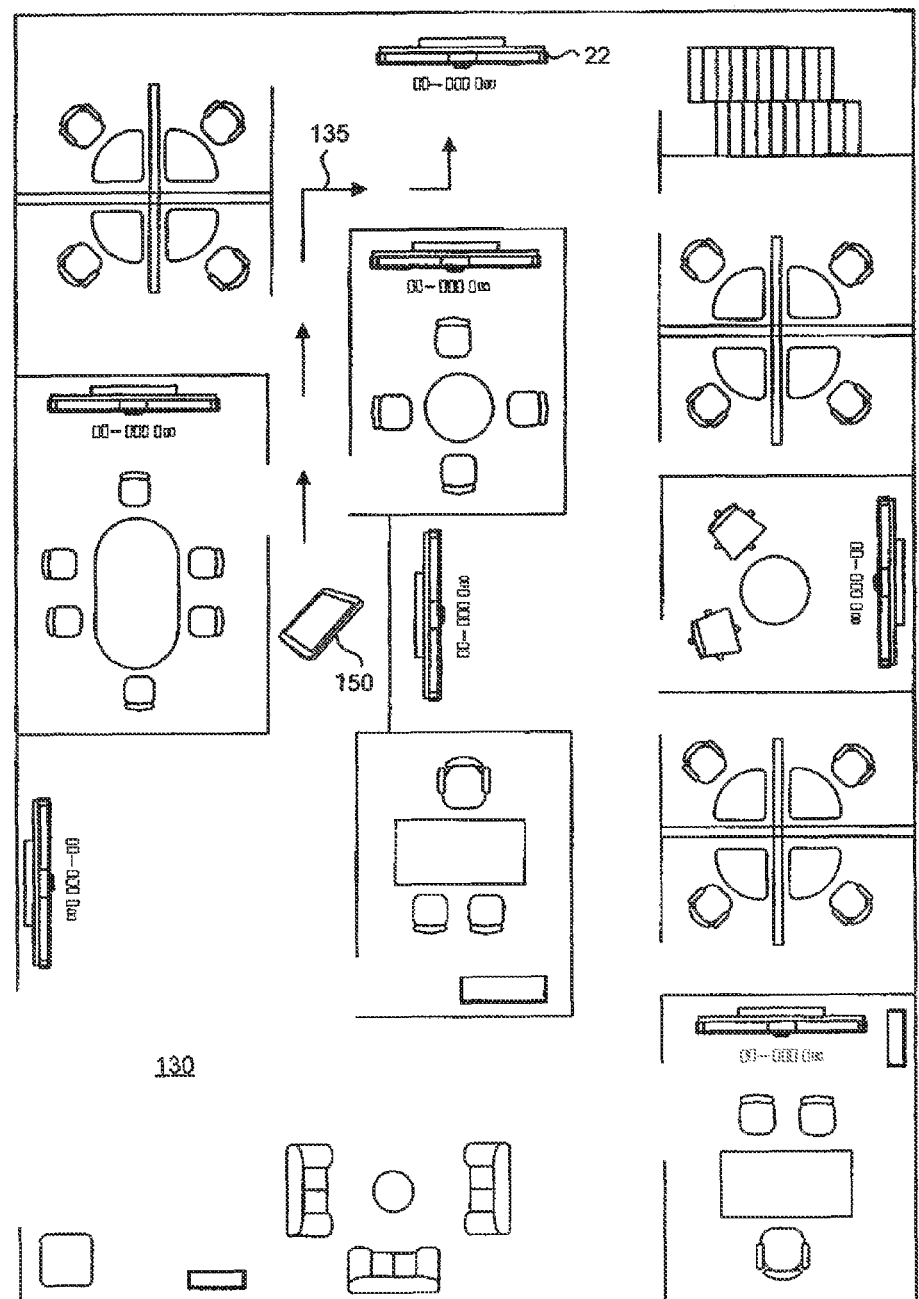
FIG. 3 shows an exemplary floor map displayed on a portable computing device forming part of the collaboration site of FIG. 2.

FIG. 3 shows an exemplary map 130 provided to the navigation software program and displayed on the interactive display surface 55 of the portable computing device 50. In this example, the map is a floor plan of an office building. As can be seen, the map 130 displays icon 150, which identifies the current location of the portable computing device 50, the various collaboration sites within the collaboration system 20 and a direction identifier 135 in the form of a series of arrows that direct the user to the location of the target collaboration site.

The orientation/direction information conveyed to the SMS 76 by the portable computing device 50 is obtained from a variety of hardware devices on the portable computing device 50. Most modern portable computing devices have a digital compass also known as a magnetometer as well as an accelerometer therein. In this embodiment, when the navigation software program communicates with the SMS 76, the meeting software client running on the portable computing device 50 polls the magnetometer to obtain the orientation of the portable computing device 50 (i.e., the direction of its movement). The meeting client software also polls the accelerometer to determine the rotation of the portable computing device 50 along the three axes. The output of the digital compass combined with the output of the accelerometer provides precise data about the orientation/direction of the portable computing device 50. In an alternative embodiment, the user may be presented with a visual pointer that can be rotated to indicate direction. This is useful in portable computing devices that do not have a digital compass. In another alternative embodiment, a camera on the portable computing device 50 may be used to take pictures of the user's surrounding. The captured pictures may be conveyed to the SMS 76 and matched with stored images of the collaboration system 20 to determine the user's location and orientation. One of skill in the art will appreciate that any combination of outputs from the above-mentioned hardware devices as well as user input may be used to generate the orientation/direction information.

When the user follows the path of the arrows towards the target collaboration site, the SMS 76 communicates updated map information to the portable computing device 50 so that the map displayed on the interactive display surface 55 of the portable computing device is updated. As a result, the icon 150 representing the portable computer device 50 reflects the current position of the portable computing device 50 within the collaboration system 20.

The fingerprint dataset of the collaboration system 20 in this embodiment is created during calibration or initialization of the collaboration system. Each wireless network device 60 has a fixed signal strength referred to as "brightness". The brightness of each wireless network device 60 at its source point (i.e. its location on the interactive board 22) is therefore known. During calibration of the collaboration system, a portable computing device 50 is moved throughout the collaboration system 20 and the received signal strength (RSS) of the Wi-Fi signal emitted by the Wi-Fi device of the portable computing device 50 that is received by each of the wireless network devices 60 in its range at a variety of locations is measured and recorded by the SMS 76 thereby to populate the fingerprint dataset.

The distance a portable computing device 50 is from a given wireless network device 60 can be determined using the received signal strength (RSS) that is observed by the wireless network device 60. The received signal strength observed by the wireless network device 60 drops as a function of the square root of the distance between the wireless network device 60 and personal computing device 50. When three (3) wireless network devices 60 within the collaboration system 20 detect the presence of the portable computing device 50, the location of the portable computing device can be accurately calculated based on the received signal strengths observed by the wireless network devices 60. As will be appreciated, the location of the portable computing device can also be determined (albeit less accurately) when two (2) wireless network 60 detect the presence of the portable computing device.

As the number of wireless network devices 60 within collaboration system 20 increases, the accuracy of locating a portable computing device 50 within the collaboration system 20 increases. In a typical office building environment, a significant number of wireless network devices 60 are present and their brightness profiles overlap each other. The location of any portable computing device can be determined by comparing the observed RSS reading from each wireless network device 60 detecting the presence of the portable computing device and finding a position in the fingerprint dataset where the observed RSS values match the fingerprints of those wireless network devices 60.

The RSS reading from a given wireless network device may fluctuate at different times during the day caused for example by different traffic patterns at different times during a day. If the RSS value is not calibrated to compensate for such fluctuations, inaccurate portable computing device location data may result. Research in this field has shown that variation in RSS values due to environmental factors is linear. Various calibration techniques to determine coefficients which can be multiplied with the observed RSS values to compensate for variations in observed signal strengths have been considered and can be employed by the SMS 76 to improve accuracy. For example, in the publication entitled "Practical Robust Localization over Large-Scale 802.11 Wireless Networks" authored by Haeberlen et al. and published in proceedings of MobiCom 2004, manual and automatic calibration techniques are proposed.

Figure 4A:
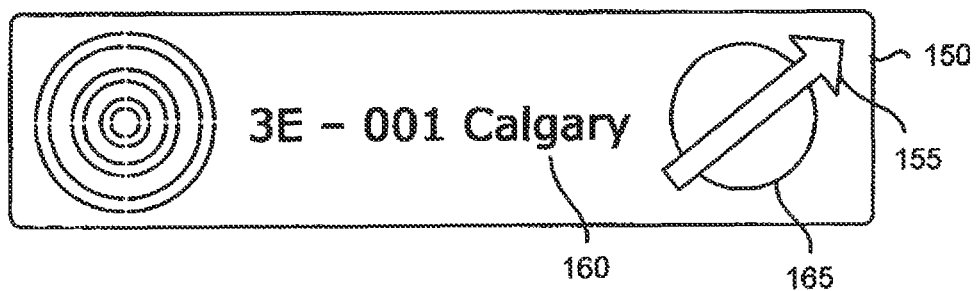
FIGS. 4A and 4B show two states of an icon in the form of a compass displayed on the portable computing device for guiding a user to a target collaboration site.
Figure 4B:
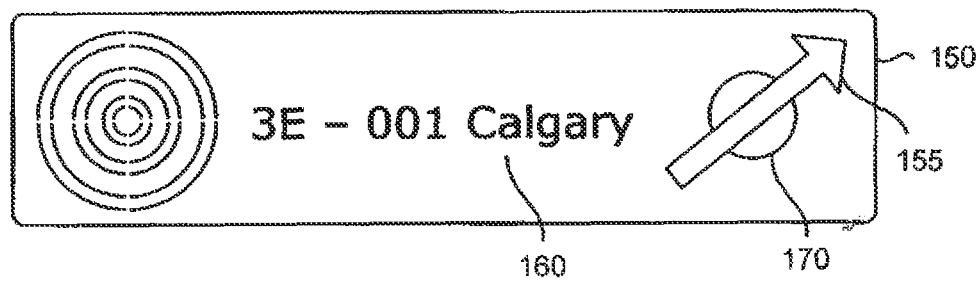

FIG. 4A better illustrates the icon 150 that is displayed on the map 130. As can be seen, the icon 150 is in the form of a compass guiding the user to the target collaboration site. The arrow 155 of the compass points in the direction of the target collaboration site and the interactive board 22 therein. The identification number 160 of the target collaboration site is shown on the compass. The size of the circle 165 behind the arrow indicates the distance of the user from the target collaboration site. As the user moves towards the target collaboration site, the distance between the target collaboration site and user decreases. Correspondingly, the size of the circle 170 behind the arrow reduces as shown in the FIG. 4B.

Returning to FIG. 3, as the user moves towards the target collaboration site, the map 130 is updated to show the current position of the user. Interactive boards 22 that are not currently in use and which are positioned along the path of the user, may be conditioned to communicate wirelessly with the portable computing device 50 to determine the target collaboration site and display signs or arrows that guide the user towards the target collaboration site. As the user approaches the target collaboration site, the interactive board 22 therein detects the presence of the user using the Wi-Fi signals emitted by the portable computing device 50 and establishes a wireless network connection with the portable computing device 50. The interactive board 22 in turn is conditioned to present a welcome screen on the interactive surface 24 to indicate to the user that the user has arrived at the target collaboration site.

If the user is invited as a participant in a scheduled meeting at the target collaboration site, which includes the interactive board 22 as a meeting resource, the user is connected to the meeting via the SMS 76. All other participants of the scheduled meeting are connected to the SMS 76 via the software client which is installed on collaboration computing device 28 connected to the interactive board 22. The SMS 76 also maintains and updates the list of meeting participants.

Figure 5:
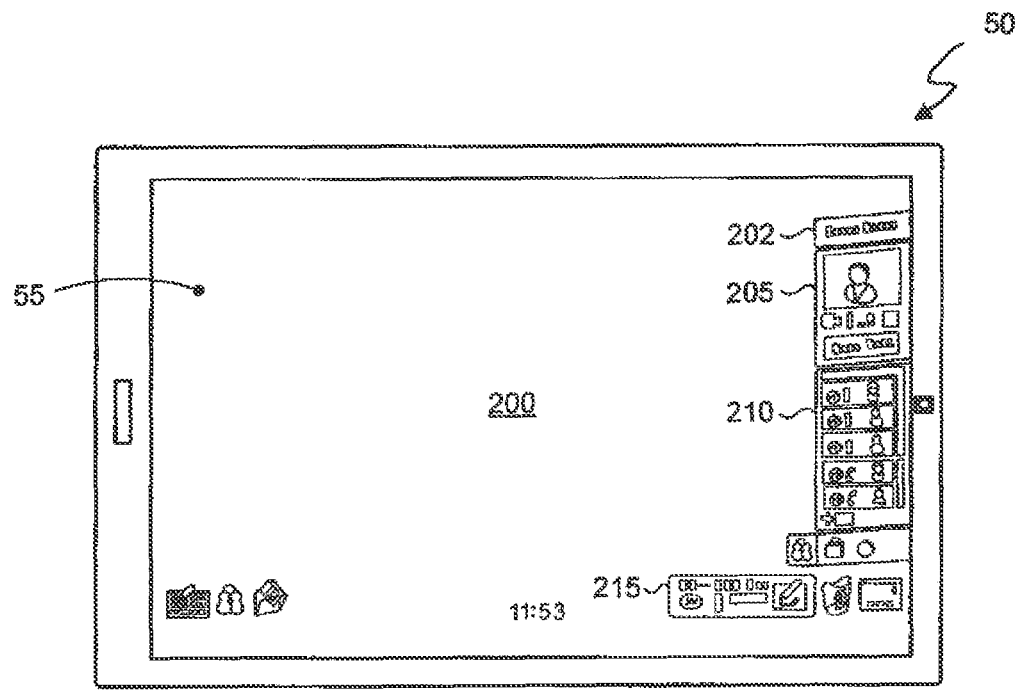
FIG. 5 shows a user interface displayed on the portable computing device and comprising collaboration tool bar and other user interface elements.

When the user joins the meeting, a user interface 200 of the client meeting software is displayed on the portable computing device 50 as shown in FIG. 5. A collaboration bar 202 is displayed along the right edge of the user interface 200. Those of skilled in the art will however appreciate that the collaboration bar 202 may be placed at a different location on the user interface 200 such as for example, along the left edge or along the bottom edge of the user interface. The collaboration bar 202 displays information about the meeting such as for example the meeting title, duration, etc. The collaboration bar 202 comprises a contact card 205 of the user as shown in the FIG. 5. The contact cards 210 of remote participants are also listed in the collaboration bar 202. Each contact card 210 indicates whether the participant has joined the meeting. A connection tile 215 representing the interactive board 22 is also displayed. Additional user interface elements including buttons and icons may be displayed in the user interface 200 to allow meeting participants to access functionality of the meeting software client. The meeting client software is also installed on the collaboration computing device 28 connected to the interactive board 22 and as a result, the user interface 200 is also displayed on the interactive board 22 when the meeting starts. The meeting client software communicates with the SMS 76 and updates any changes in the status of the meeting participants.

As mentioned above, the collaboration bar 202 is visible on the user interface 200 when the meeting starts. A meeting participant can however, input a command to hide the collaboration bar 202 when needed. When the collaboration bar is hidden, a thin strip is visible along the right edge of user interface 200 to indicate that the collaboration bar 202 is active but is in a hidden state. The collaboration bar 202 can be displayed again by hovering a pointer over the strip.

Figure 6:
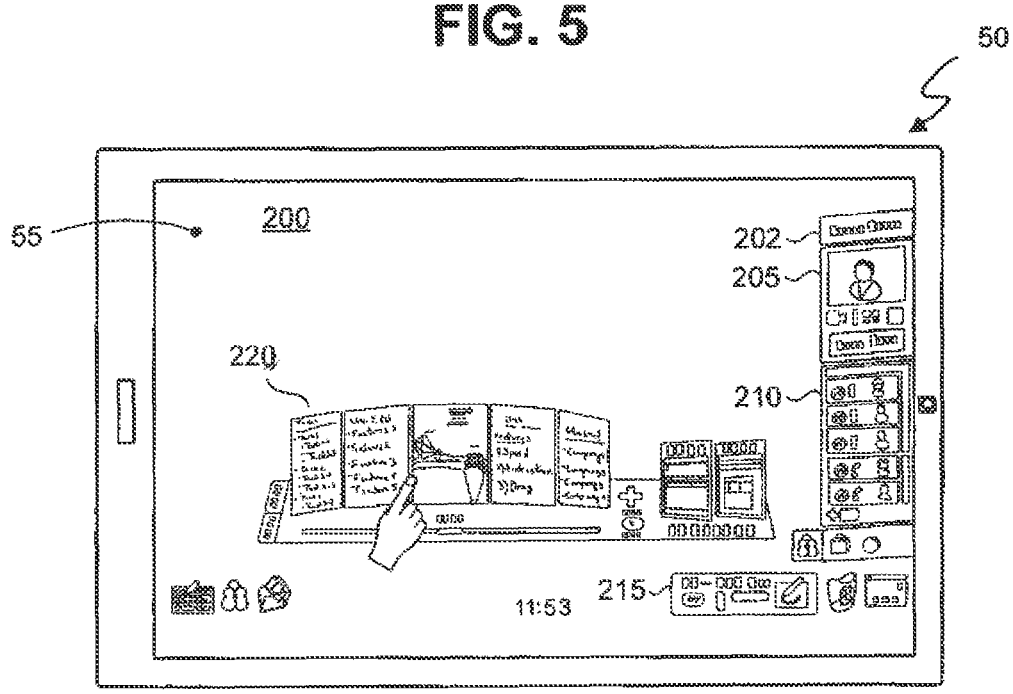
FIG. 6 shows a page navigator displayed on the user interface of FIG. 5 for selection of specific pages from a document.
Figure 7:
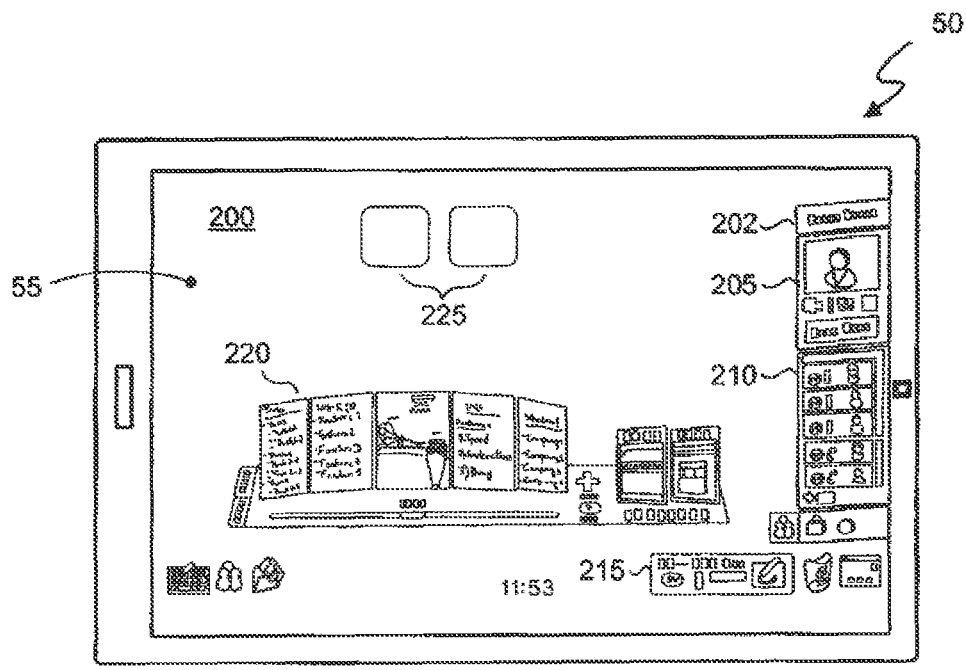
FIG. 7 shows the page navigator of FIG. 6 as well as thumbnails of pages that have been selected using the page navigator.
Figure 8:
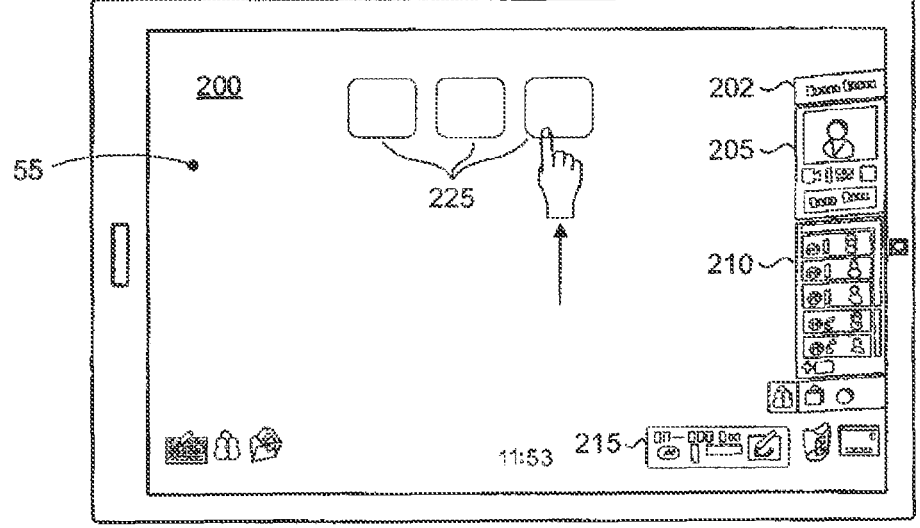
FIG. 8 shows a user selecting a page thumbnail.

A meeting participant can send electronic documents to other meeting participants or to the interactive board 22. In this embodiment, the meeting participant may send an entire document by selecting it through the file browser on their portable computing device 50. When the meeting participant wants to send selected pages from a document, the sending participant opens a page navigator 220 as shown in FIG. 6. The page navigator 220 allows the participant to scroll through the pages of the document in a forward or backward direction by performing a swiping gesture with a finger. The user can then select the desired page or pages to be sent to another participant or to the interactive board 22 by dragging each desired page to a top portion of the user interface 200 as identified by the reference numeral 225 in FIG. 7. When the user has selected all the desired pages to be sent, the page navigator 220 is closed and the thumbnails of the selected pages 225 are dragged to their target destination as shown in FIG. 8. The target destination may be a participant listed in the participant area 210 or the interactive board 22 represented by the connection tile 215.

Figure 9:
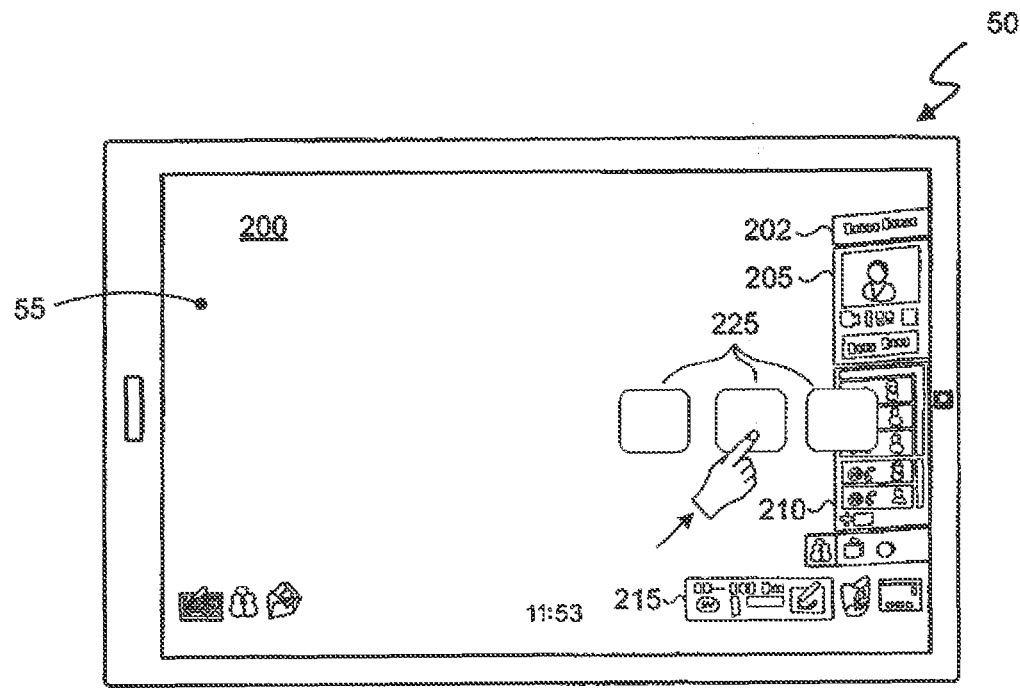
FIG. 9 shows a user moving selected page thumbnails to a participant's contact card.
Figure 10:
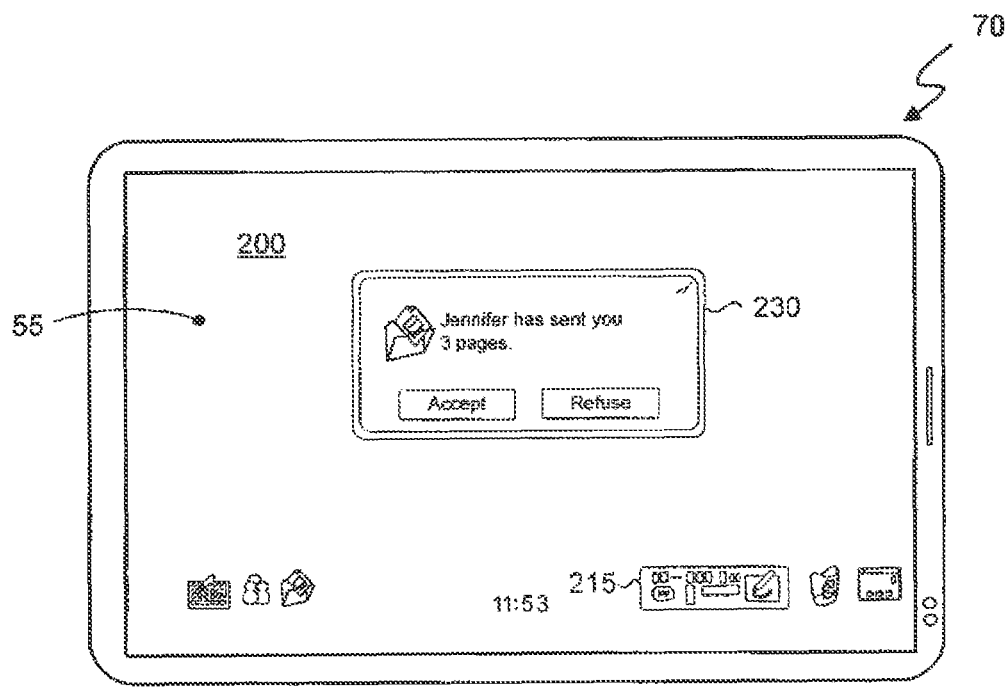
FIG. 10 shows a message displayed on the portable computing device providing information concerning an incoming document.

In FIG. 9, the user drags the page thumbnails 225 to a participant listed in the participant area 210. When this occurs, the contact card of the target participant changes colour to visually indicate that the target participant has been selected for the page transfer. When the participant lifts their finger from the page thumbnails 225, the target participant receives a message 230 on their computing device 70 as shown in FIG. 10. The target participant may either accept or reject the pages being sent by selecting the respective button on the user interface element 230. If the target participant accepts the page transfer, the document pages are transferred in a file to the computing device 70 via the SMS 76. When the file transfer is initiated, both the sending and the target participants receive a notification that the file transfer is in progress along with other information such as the file name, file type and the time remaining to complete the transfer. The sending and the target participants also receive a message when the file transfer is complete.

Upon receipt of the transferred file, the computing device 50A of the target participant opens the received file using appropriate software. If the target participant refuses the file transfer by selecting the corresponding button on the file transfer notification 230, the file transfer is cancelled and the sending participant receives a message that the target participant has refused to accept the file transfer.

If the participant drops the page thumbnails 225 on the connection tile 215, the pages are transferred in a file to the interactive board 22. No notification of this transfer is sent to the interactive board 22. Therefore, no approval of this file transfer is required from the interactive board 22. In an alternative embodiment, a notification is displayed on the interactive board 22 before starting the file transfer to the interactive board 22. This notification is displayed for a short amount of time such as for example, ten (10) seconds. A user standing near the interactive board 22 may click on the notification to cancel the file transfer. If no user cancels the file transfer, the notification disappears from the interactive board 22 and the file is transferred from the participant's portable computing device 50 to the interactive board 22.

If there are multiple interactive boards 22 present in the meeting room and included as resources in the meeting, connection tiles 215 representing each of the interactive boards 22 are displayed on the user interface 200. The participant may select one or more of the connection tiles 215 representing the interactive boards. The interactive boards associated with each of the selected connection tiles receive the file.

Figure 11:
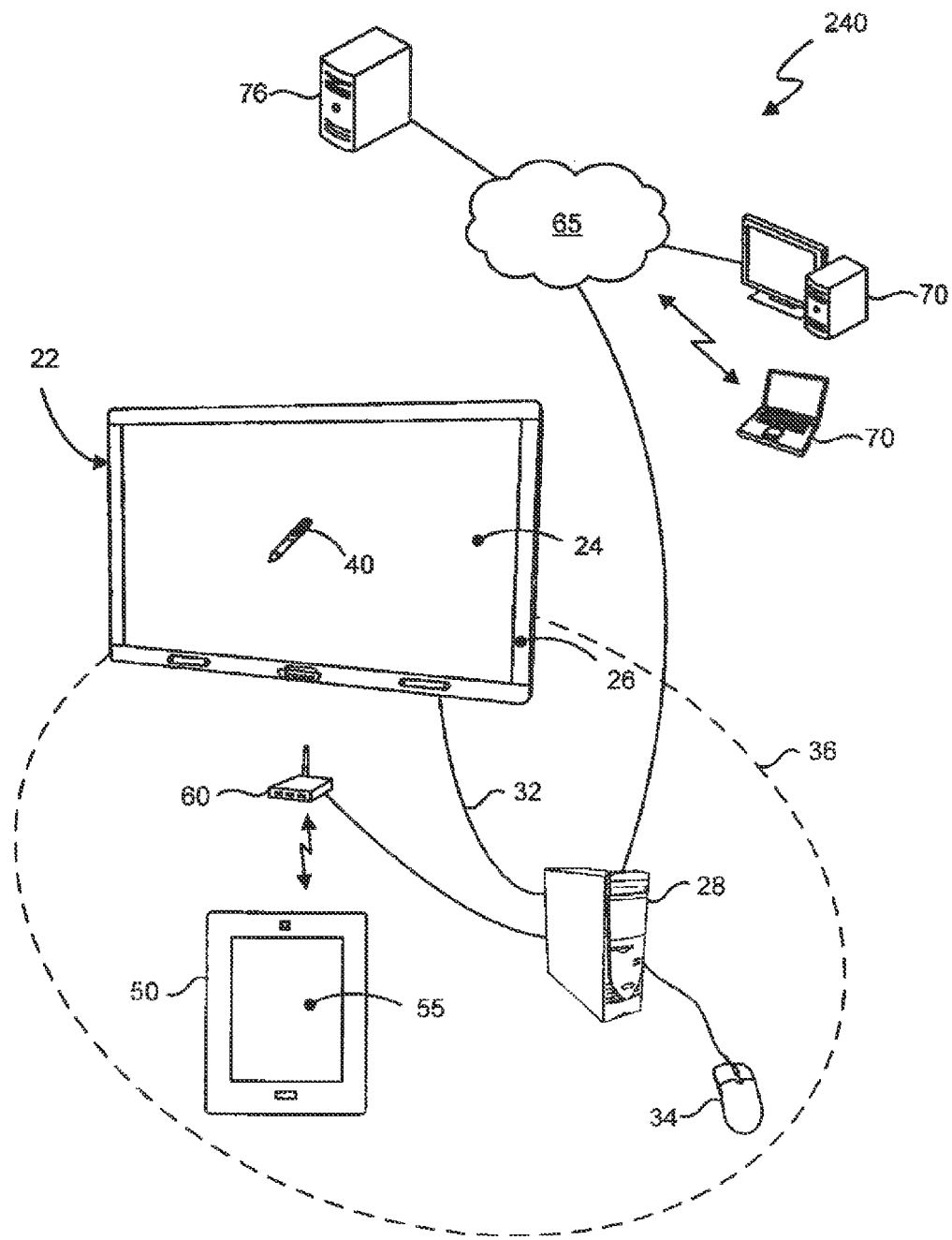
FIG. 11 is a perspective view of another embodiment of a collaboration system.
Figure 12:
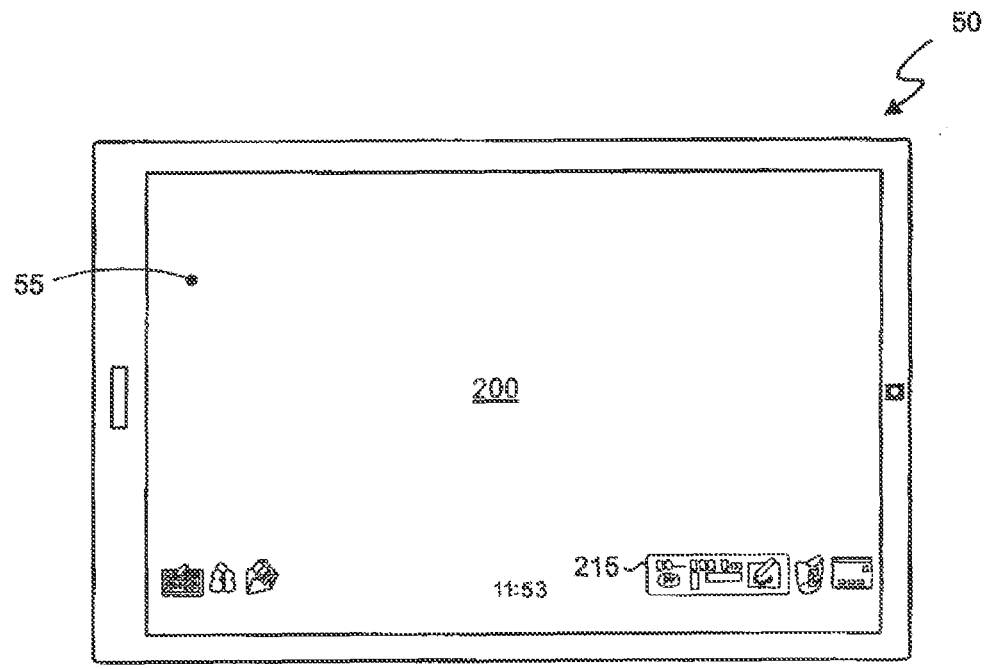
FIG. 12 shows the display screen of a portable computing device that is connected to an interactive board during an ad hoc meeting.

In an alternative embodiment, the collaboration system allows users to establish ad-hoc or unscheduled meetings. FIG. 11 shows a schematic diagram of such a collaboration system 240. Collaboration system 240 is similar to collaboration system 20 but does not comprise a scheduling server 78. As a result, the meeting collaboration bar 202 is not displayed on the user interface 200 as shown in FIG. 12. The icon 150 does not provide directions to a target collaboration site but rather indicates the direction to the nearest available interactive board 22. If there are multiple interactive boards that are available for the ad hoc meeting, a compass tile for each interactive board is displayed on the portable computing device 50 in a stacked manner. When the user selects a target interactive board by selecting its icon 150, a map is displayed on the user's portable computing device with an indicator to guide the user to the selected interactive board 22. When the user is within a close range of the selected interactive board 22 and the user's portable computing device has established a wireless network connection via the wireless network device 60 of the interactive board, the compass is replaced by the connection tile 215 as shown in FIG. 12. This provides an indication to the user that the portable computing device 50 is connected to the wireless network. In this case, the user does not need to provide login credentials to connect to the wireless network. FIG. 12 shows the state of the user interface 200 on the portable computing device 50 at the start of the ad hoc meeting.

Figure 13:
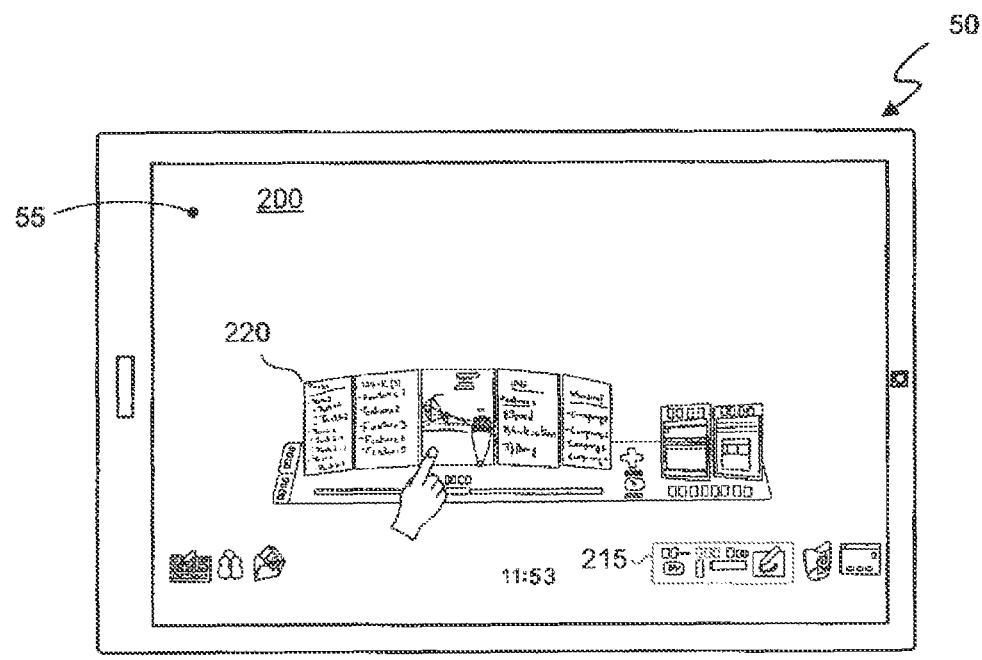
FIG. 13 shows a page navigator displayed on the portable computing device during the ad hoc meeting.
Figure 14:
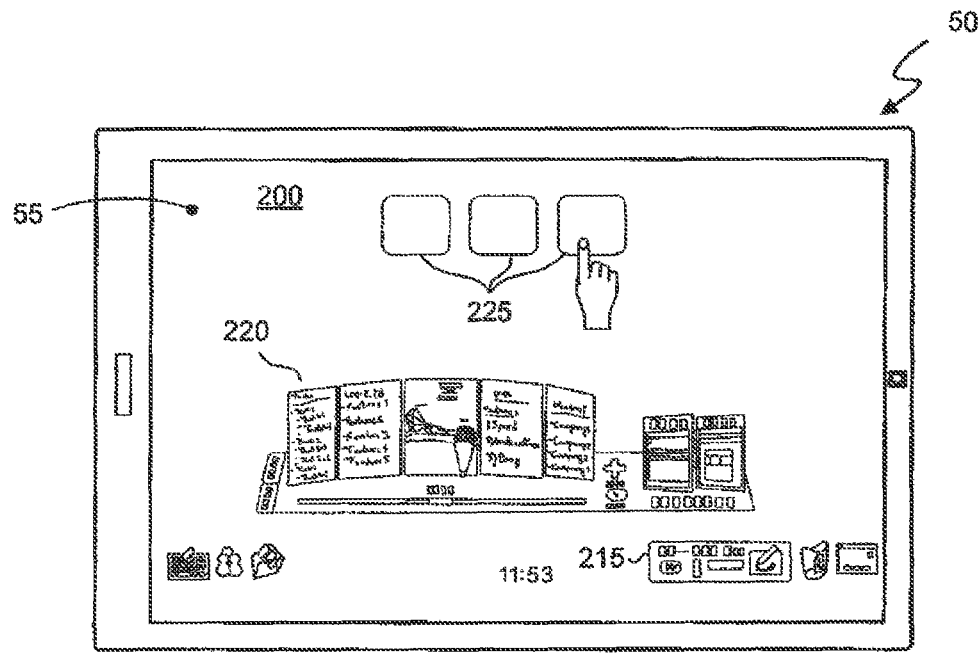
FIG. 14 shows the thumbnails of selected pages displayed on the portable computing device during the ad hoc meeting.
Figure 15:
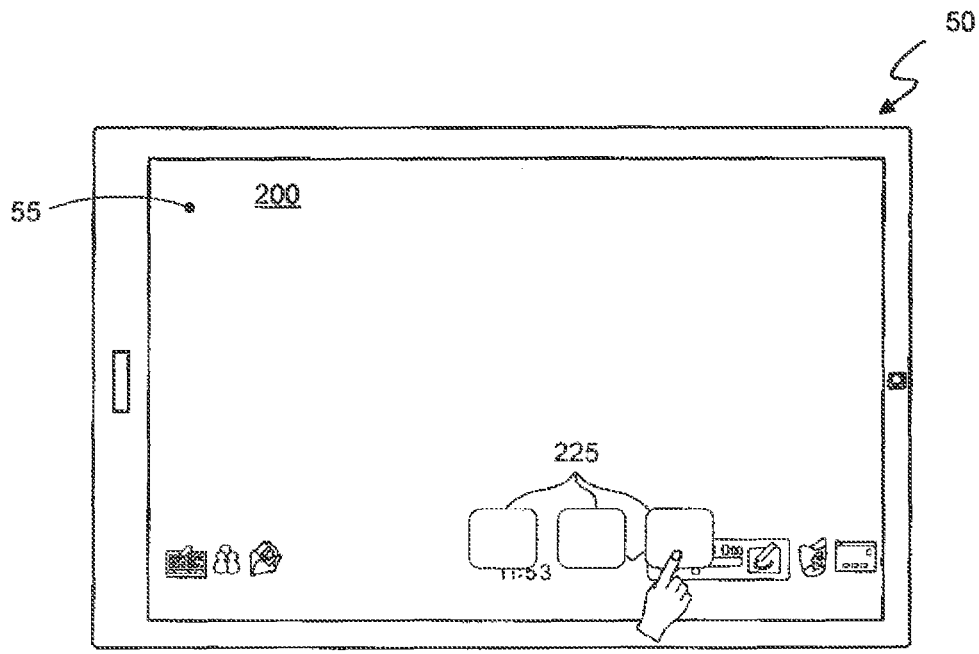
FIG. 15 shows selected page thumbnails being dragged and dropped to the connection tile of the interactive board during the ad hoc meeting.

If the user wants to open a file on the interactive board 22, the user selects the file from the file browser on the portable computer device 50 and drags it to the top portion of the user interface 200. The file in response is transferred to the interactive board 22. Alternatively, the user may drag the selected file to the connection tile 215 of the interactive board 22. If the user wants to transfer only selected pages of a document to the interactive board 22 then then the user opens the page navigator 220 as shown in FIG. 13. The user is able to scroll through the document using the swiping gesture and select the page or pages to be sent to the interactive board 22 by dragging each page to be sent to the top portion of the user interface 200. The thumbnails 225 of the selected pages remain at the top portion of the user interface 200 as shown in FIG. 14. After the page selection is complete, the user drags the thumbnails of the selected pages 225 to the connection tile 215 of the interactive board 22 as shown in FIG. 15. Upon release of the thumbnails on the connection tile 215, the selected pages are transferred in a file to the interactive board 22.

Figure 16:
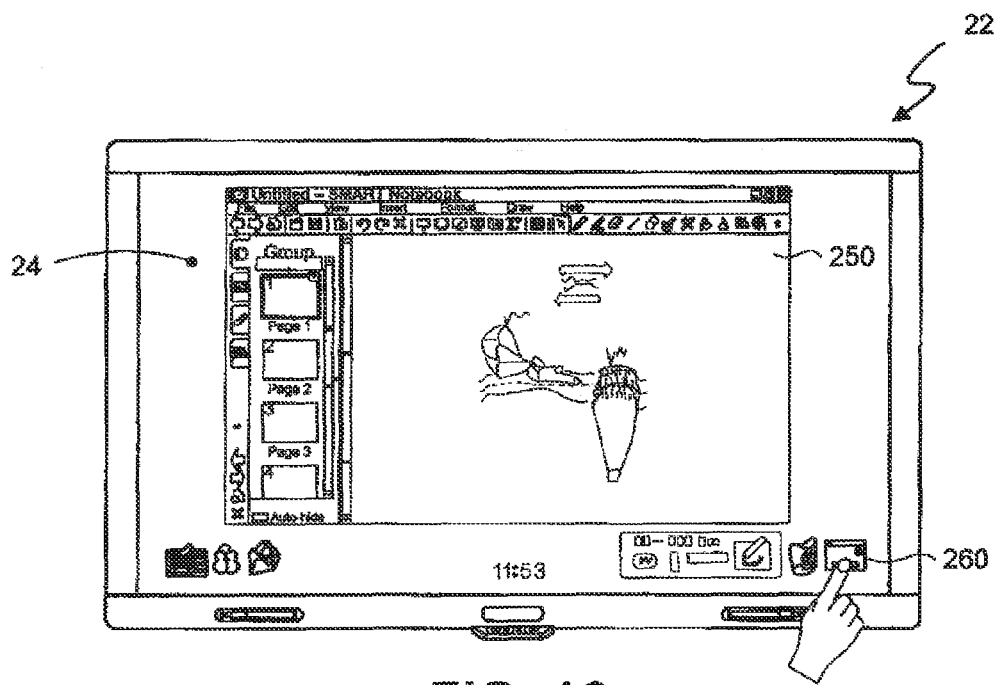
FIG. 16 shows content of a page opened in SMART Notebook™ software running on the interactive board.

When the file transfer to the interactive board 22 is complete, the transferred file is opened using an appropriate software application. For example, as shown in FIG. 16, the transferred file is a SMART® Notebook™ file and therefore, the file is opened in the SMART® Notebook™ application software 250.

Figure 17:
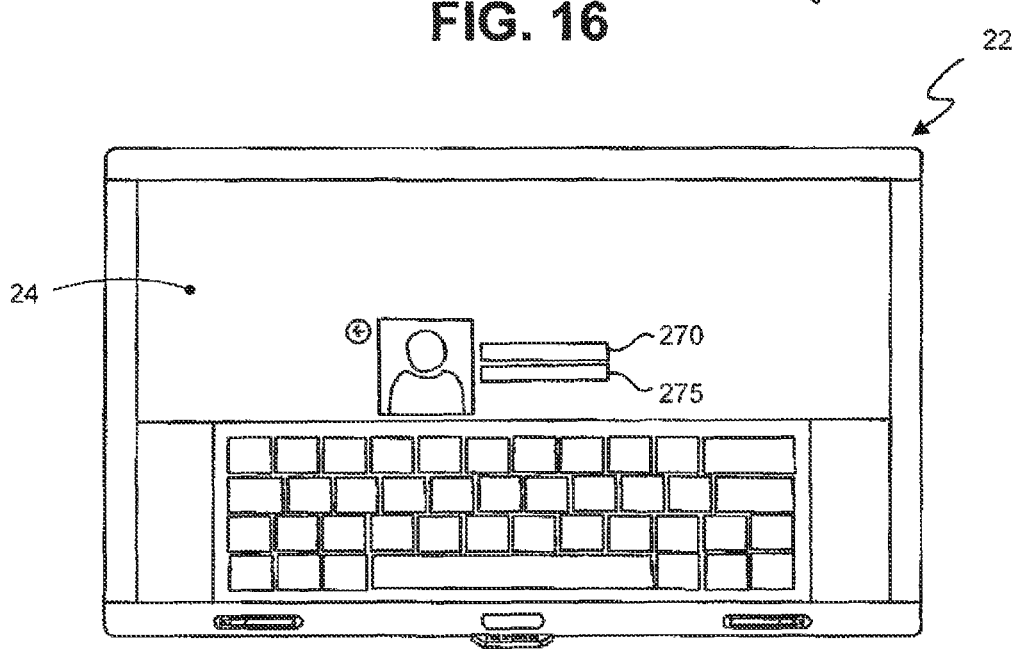
FIG. 17 shows a user login page with an onscreen keyboard displayed on the interactive board.
Figure 18:
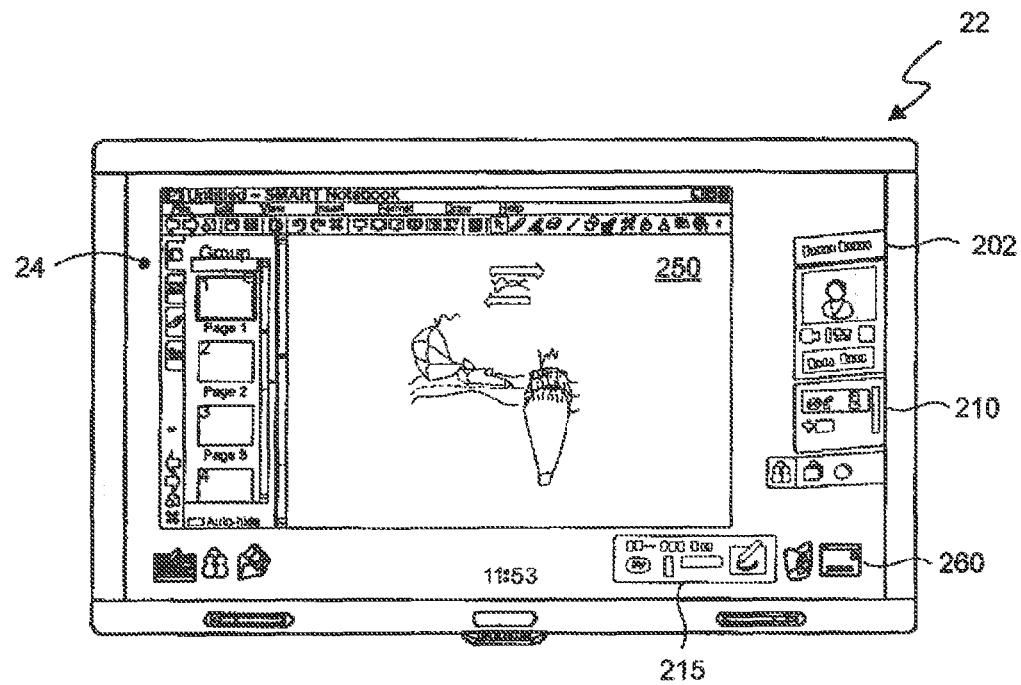
FIG. 18 shows content of a page opened in SMART Notebook™ software after a user logs in during the ad hoc meeting.

The user can also invite remote participants to the meeting by selecting meeting icon 260. When this occurs, the user is prompted to provide their login 270 and password 275 (FIG. 17) to start the meeting and send an invitation to each invited remote participant. After validating the user's credentials, the collaboration tool bar 202 is displayed as shown in FIG.

18. The user can invite remote participants to the meeting by selecting their names from the directory listing of the organization. The contact cards 210 of the invited meeting participants are displayed in the collaboration tool bar 202.

Figure 19:
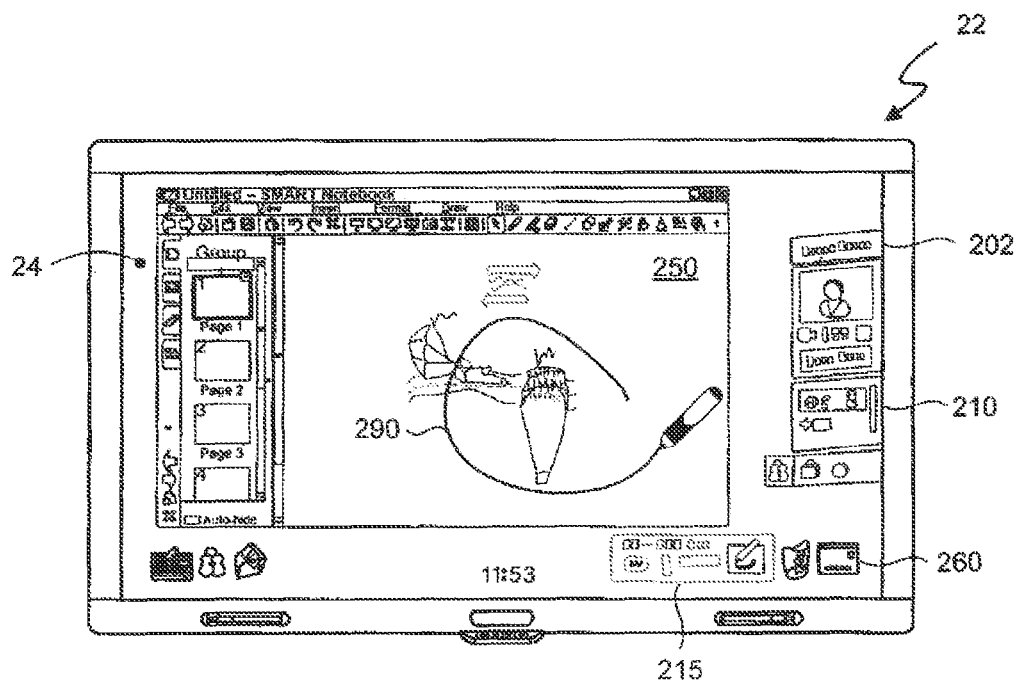
FIG. 19 shows ink annotation on the content of the page displayed on the interactive board.
Figure 20:
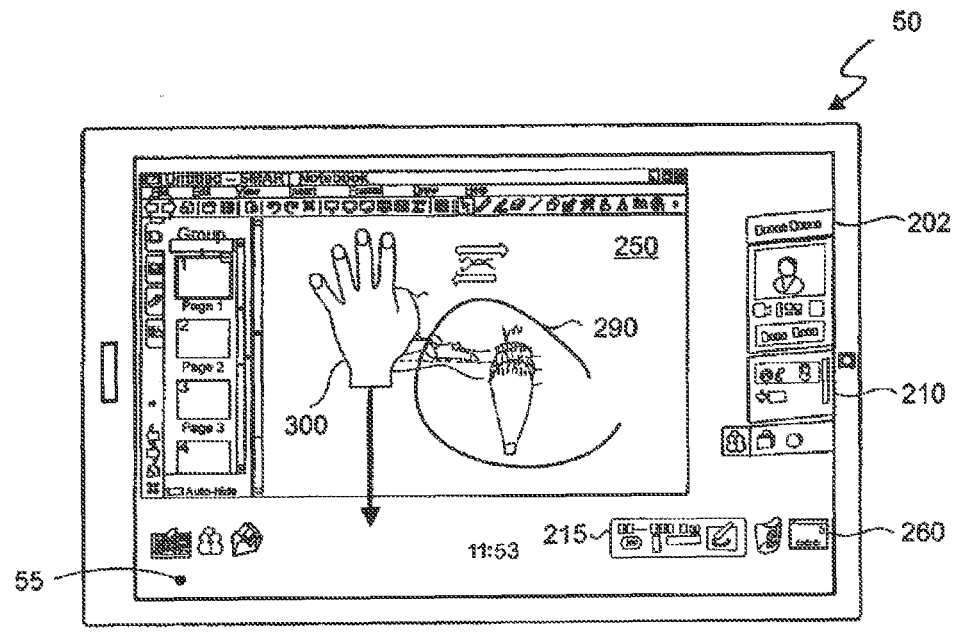
FIG. 20 shows a user performing a four figure gesture to download an updated file from the interactive board to the user's portable computing device.

During the ad hoc meeting, annotations 290 may be made on the pages of the opened file as shown in FIG. 19. The participants may add other types of content to the document pages such as text, pictures, etc. After the meeting is finished, the user can download the updated file by performing a four figure swipe gesture 300 on the interactive surface 24 of the interactive board 22 as shown in FIG. 20. The updated file in response is then downloaded to the portable computing device 50. After the file is downloaded, it is deleted from the interactive board 22.

Figure 21:
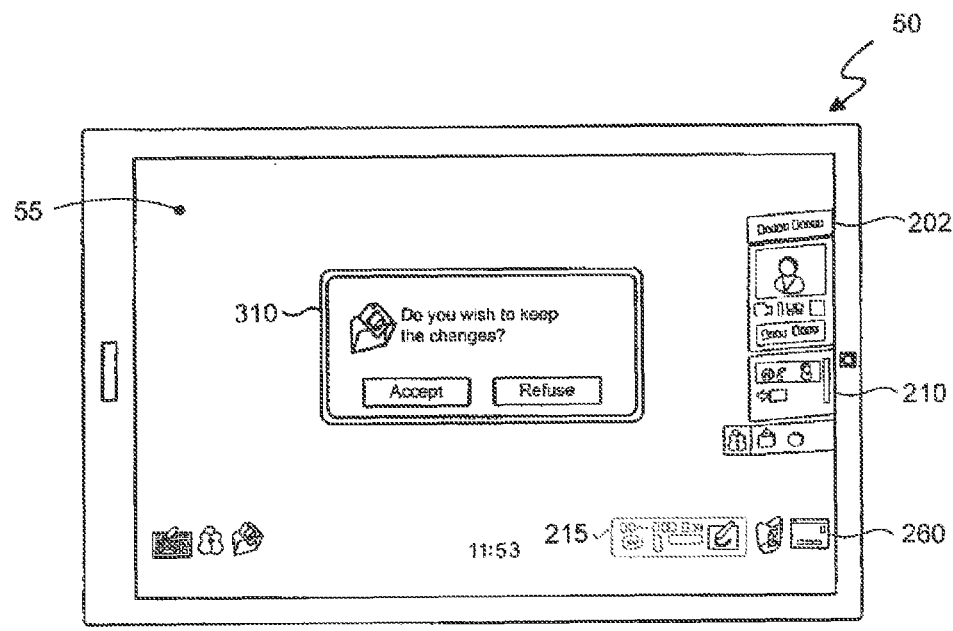
FIG. 21 shows a message dialog box displayed on the user's portable computing device to save a document that has been updated during the ad hoc meeting.
Figure 22:
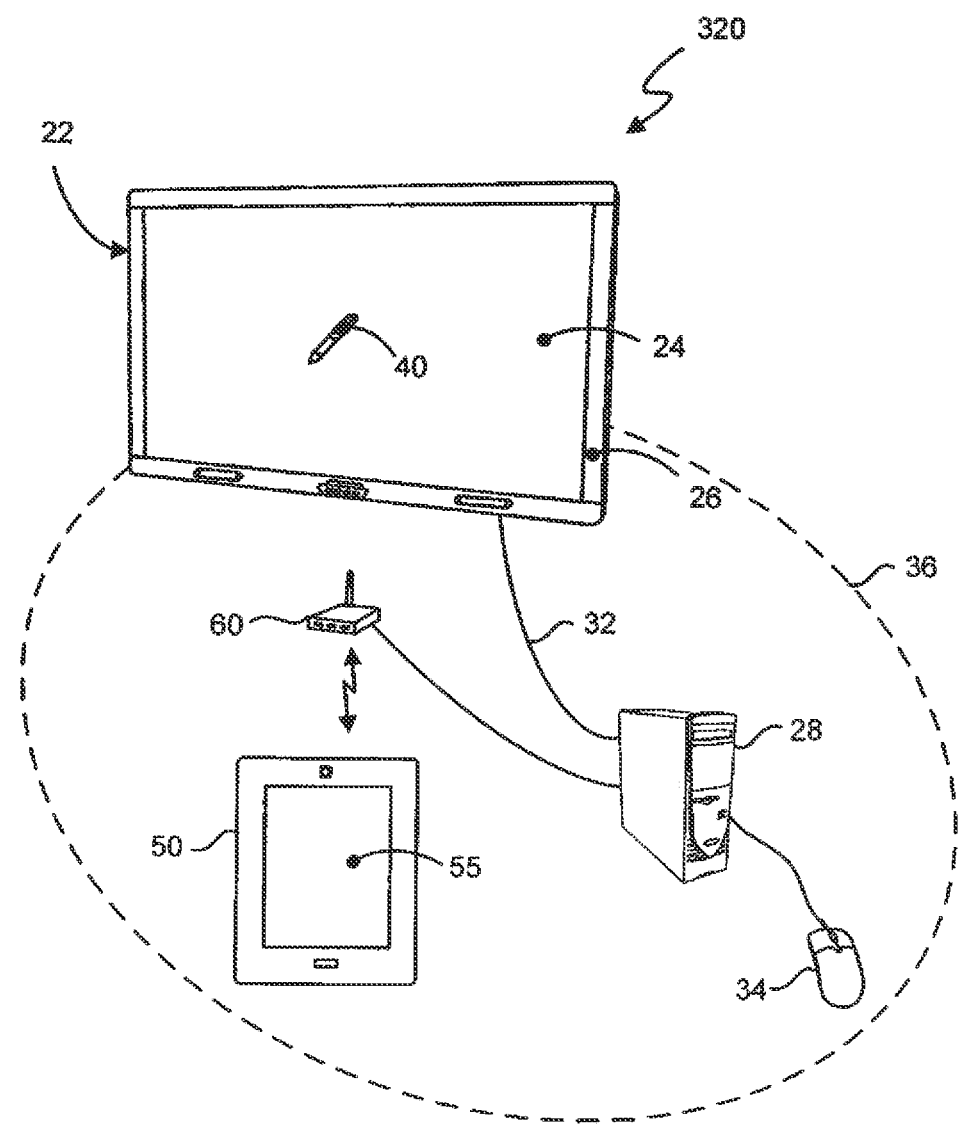
FIG. 22 is a perspective view of yet another embodiment of a collaboration system.

Alternatively, the user can select the connection tile 260 to initiate the file transfer from the interactive board 22 to the portable computing device 50. In this case, a notification 310 is presented to the user to either accept or refuse the file transfer from the interactive board 22 as shown in FIG. 21. If the user accepts the file transfer, the updated file from the interactive board 22 is transferred to the portable computing device 50 via the meeting server 76.

If the user moves away from the interactive board 22 without performing the four figure swipe gesture or selecting the connection tile 260, the meeting software client determines whether the content of the opened file has been changed on the interactive board 22. If so, the notification 310 is presented to the user before the user moves out of range of the wireless network device 60 of the interactive board 22. This will give the user the opportunity to download the updated file to the portable computing device 50 from the interactive board 22. After the user moves out of range of the wireless network device 60 of the interactive board 22, the file on the interactive board 22 is closed and deleted. The user is then logged out of the meeting software client.

The collaboration system also accommodates guest users. A guest user is defined as a person who is does not have authorization to access the network 65. As a result, the guest user's portable computing device 50 does not have the meeting software client installed on it. Therefore, it is not possible for the guest user to join a scheduled meeting or conduct an ad hoc meeting as described above. Since the guest user does not have the meeting software client on their portable computing device 50, the guest user is not able to search and find a specific interactive board in the collaboration system. Typically, visitors to an office building are escorted by a member of the organization. Therefore, it is expected that while the guest user is in the office building, the guest user will be guided by the escort to the interactive board 22 with which the guest user is to interact and join a meeting.

Figure 23:
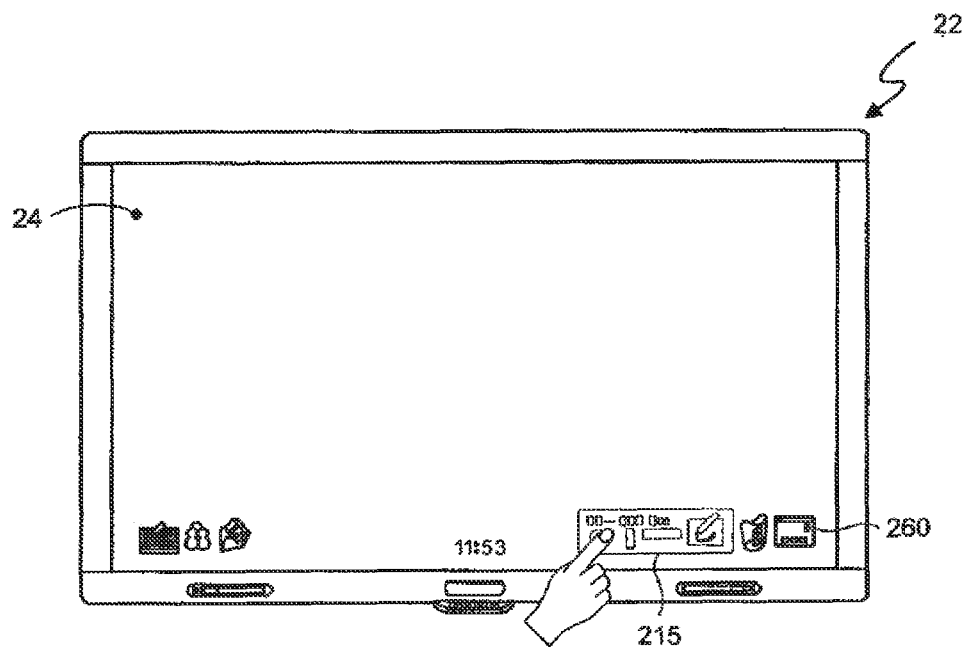
FIG. 23 shows the interactive board when no user is using the interactive board for a meeting.
Figure 24:
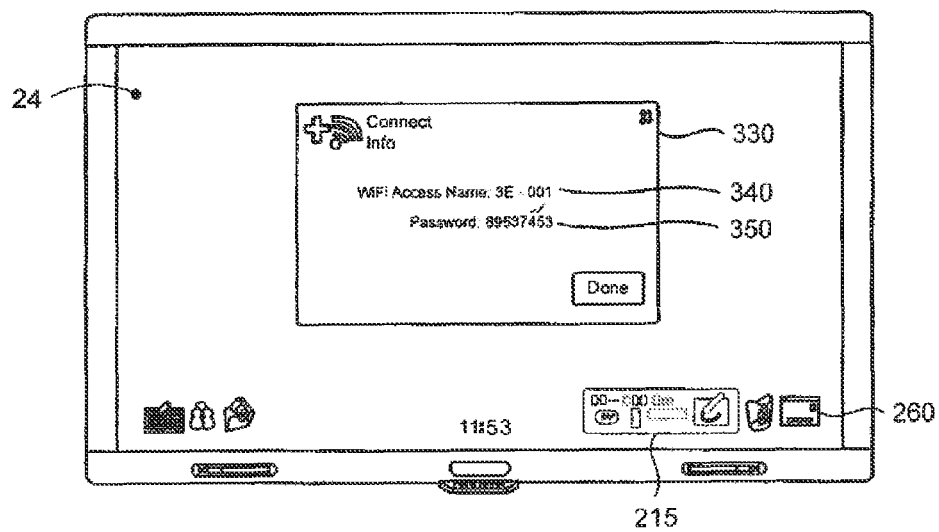
FIG. 24 displays the identification and password of the interactive board's wireless network for use by a guest user.

When the guest user is brought to the interactive board 22 which is available for a meeting, the guest user is prompted to select a button on the connection tile 215 representing the interactive board 22 that is displayed on the interactive surface 24 of the interactive board (FIG. 23). In response, the interactive board 22 presents a window 330 on its interactive surface 24 as shown in FIG. 24. The information necessary for the guest user to connect to the interactive board 22 via its wireless network device 60 is displayed on the window 330. This information includes the SSID 340 of the wireless network and the password 350. The password in this embodiment is a randomly generated eight digit number which is periodically changed after a pre-defined amount of time while the interactive board 22 is not being used. In one embodiment the password changes every five minutes.

Figure 25:
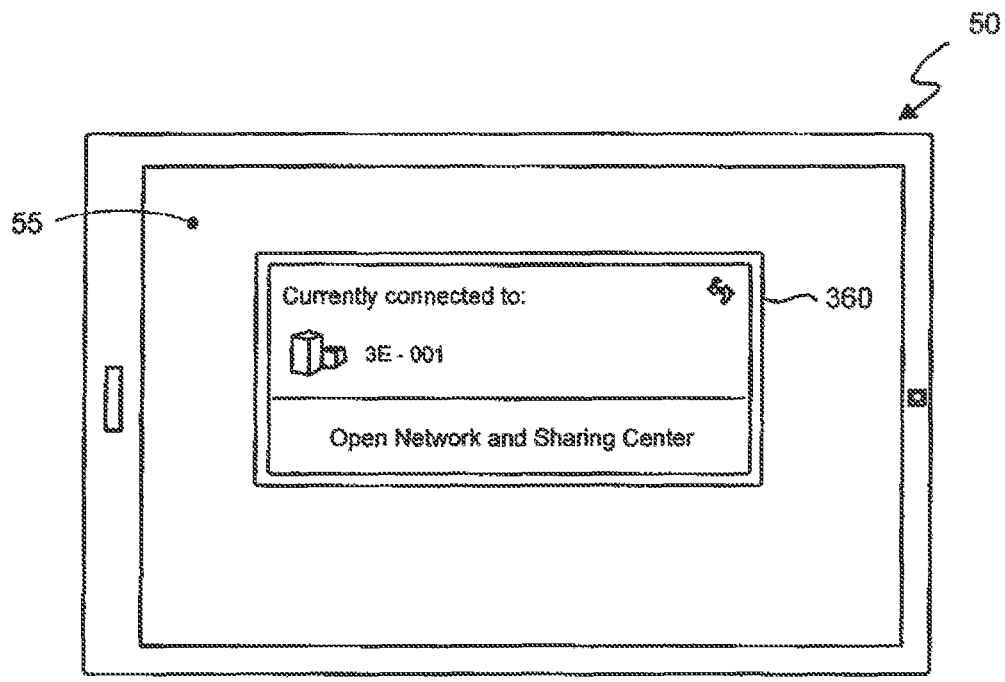
FIG. 25 shows a notification message displayed on the user's portable computing device indicating that the portable computing device is connected to the wireless network of the interactive board.

When the guest user uses their portable computing device 50 to bring up all the available wireless networks, the SSID 340 of the wireless network 36 appears in the list allowing the guest user to select it. Once selected, the guest user is prompted to enter the password 350 and once the password is entered, the guest user's portable computing device is connected to the wireless network. When the guest user's portable computing device 50 is connected to the wireless network, a notification 360 is displayed on the interactive display surface 55 indicating that portable computing device 50 is wirelessly connected to the interactive board 22 having the identification 3E-001 (see FIG. 25).

In an alternative embodiment, a quick response (QR) code is displayed on the interactive board 22 beside the information window 330 as shown in FIG. 24. The QR code contains the SSID and the password of the wireless network 36. The user can take a picture of the QR code with a camera on their portable computing device. A software application installed on the portable computing device 50 decodes the information contained in the QR code and uses the decoded information to connect the guest user's portable computing device to the wireless network 36. As will be appreciated, this method of connecting to the wireless network does not require the user to manually select the SSID and enter the password.

Figure 26:
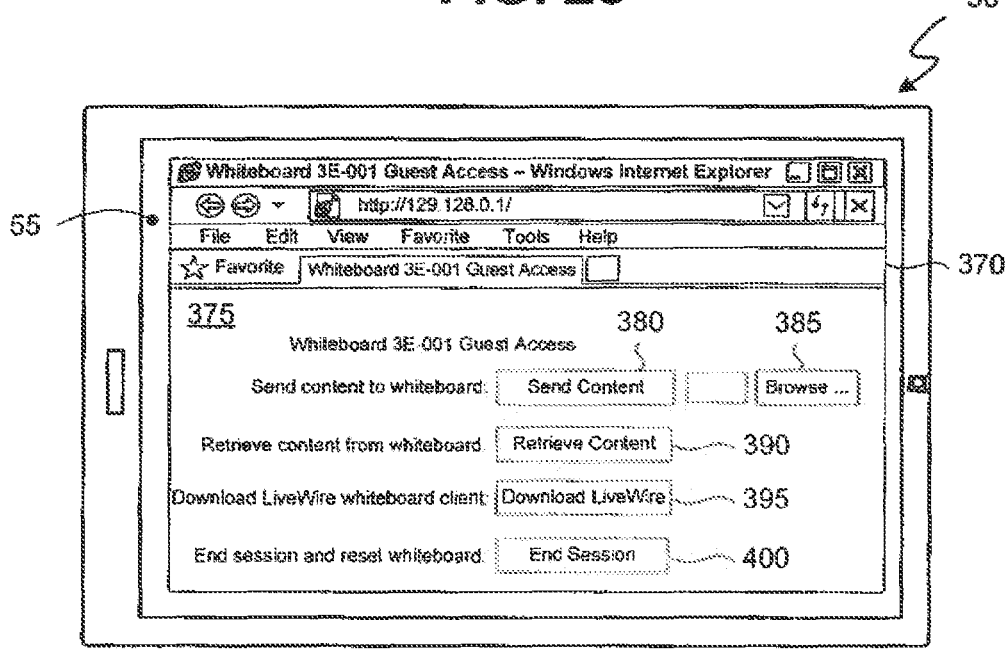
FIG. 26 shows menu options displayed on a guest user home page for the interactive board.

When the guest user opens the internet browser 370 on the portable computing device 50, the internet browser 370 is directed to a home page 375 providing menu options to the guest user allowing the guest user to send a file to the interactive board 22 as shown in FIG. 26. The home page 375 provides several options to the guest user. Selecting button 385 allows the guest user to browse through the files on the portable computing device 50 and select the file to be uploaded to the interactive board 22. Selecting button 380 initiates uploading of the selected file to the interactive board 22.

Figure 27:
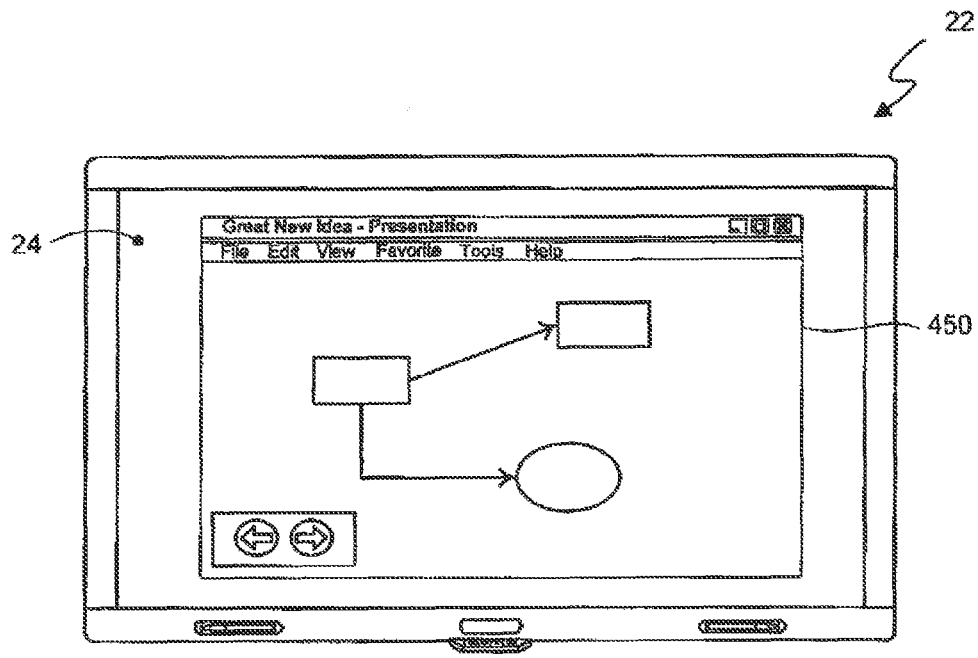
FIG. 27 shows content of the guest user's file displayed on the interactive board.
Figure 29:
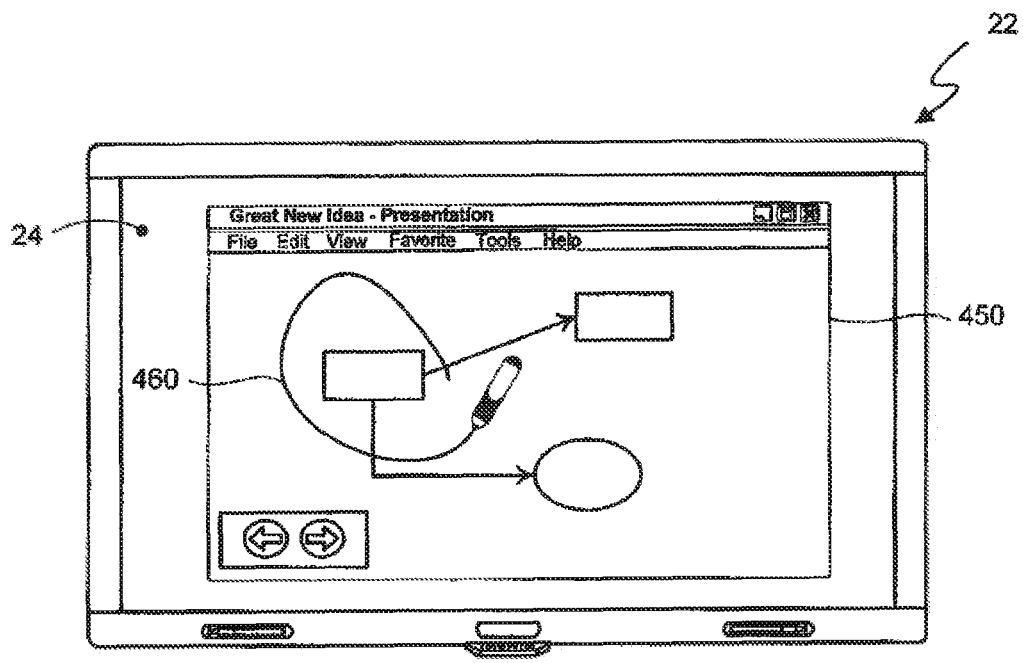
FIG. 29 shows ink annotation on the content of the guest user's file opened on the interactive board.

When the selected file has been uploaded to the interactive board 22 from the portable computing device 50, the collaboration computing device 28 connected to the interactive board 22 scans the file for viruses or malware. If the file is determined to be safe, collaboration computing device 28 determines the software application necessary to open the file. The file is then be opened using that software application and is presented on the interactive display 24 of the interactive board 22. FIG. 27 shows content of an exemplary file opened and displayed in a window 450 on the interactive board 22. The guest user is then able to go through the content of the file during the meeting. During the meeting session with other meeting participants, the guest user may annotate on the content of the file as indicated by the numeral 460 in FIG. 29.

The home page 375 (see FIG. 26) also provides functionality to allow the updated file to be retrieved from the interactive board 22 by selecting button 390. When this occurs, the interactive board 22 saves the file with the current state of the content and downloads it to the guest user's portable computing device 50. The meeting session is not closed after file transfer is complete.

The guest user can end the meeting session by selecting button 400. This action will terminate the meeting on the interactive board 22. At this point, the guest user's file is deleted from the interactive board 22 and the interactive board returns to an idle state waiting for the next meeting. Once the file is deleted from the interactive board 22, its content cannot be recovered. If the guest user has not saved the most recent version of the file opened on the interactive board 22, a message is displayed to the guest user prompting the guest user to save the file before it is deleted from the interactive board 22.

Figure 28:
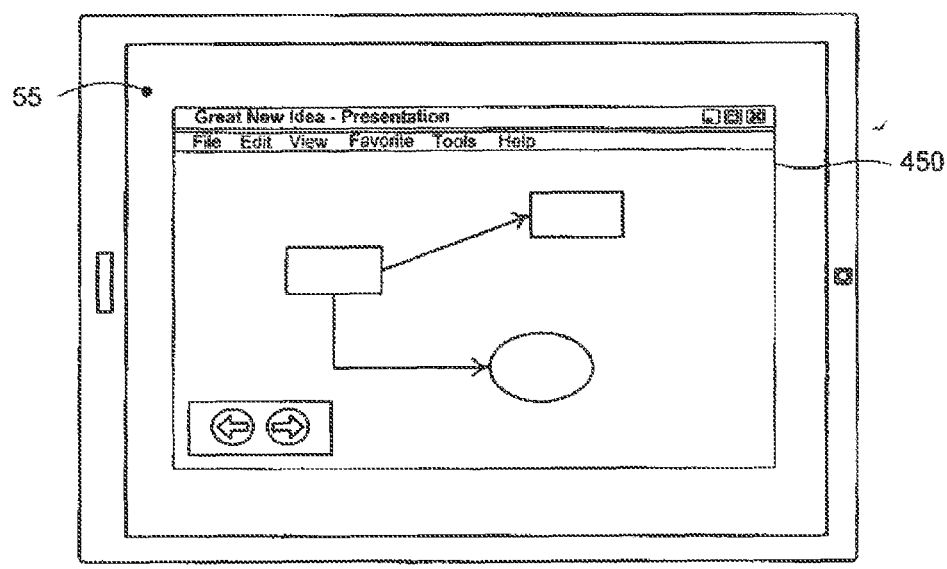
FIG. 28 displays the content of the interactive board replicated on the display of the guest user's portable computing device when meeting client software is running on the guest user's portable computing device.

The guest user can download the meeting software client onto the portable computing device 50 by selecting button 395. The meeting software client once downloaded executes on the guest user's portable computing device 50 without any installation process. The meeting software client provides screen sharing functionality. While the guest user is presenting the file via the interactive board 22, the image presented on the interactive board is mirrored to the guest user's portable computing device 50 as shown in FIG. 28.

The meeting software client provides the functionality to save the ink annotated version of the opened file as a SMART® Notebook™ file on the guest user's portable computing device 50. When the software client is closed, the software client asks the guest user whether the ink annotations are to be saved. If the meeting is ended either by selecting the button or by the guest user moving out of the range of the wireless network device of the interactive board 22, the meeting software client is closed and deleted from the guest user's portable computing device 50.

Figure 30:
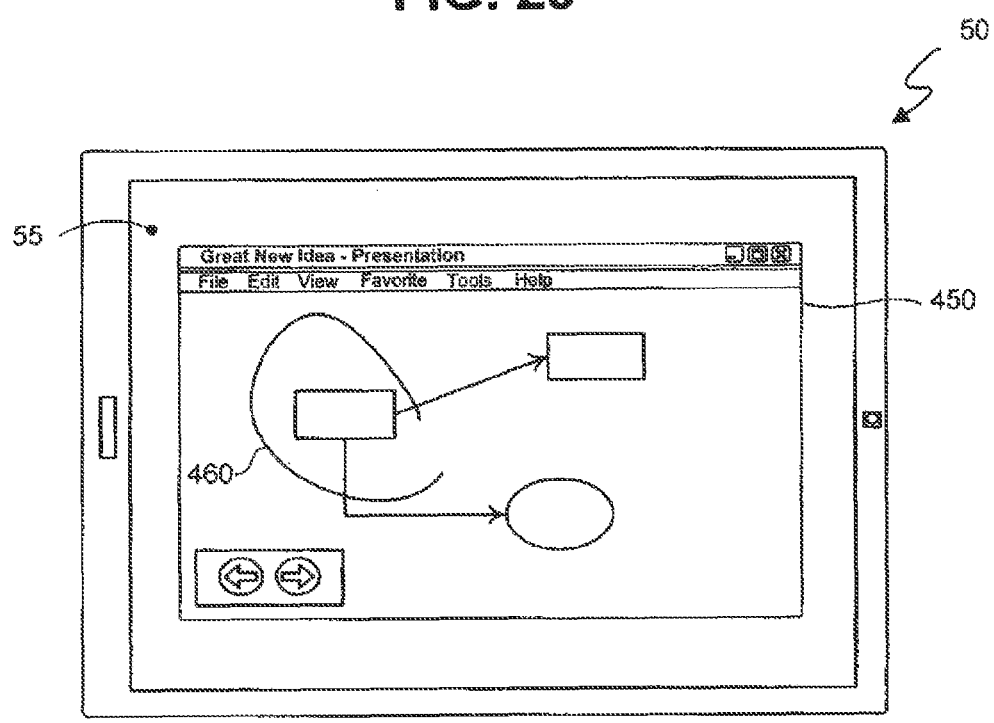
FIG. 30 shows the replicated image of the ink annotated page of the guest user's file on the guest user's portable computing device when the meeting client is running on the guest user's portable computing device.

If the guest user's portable computing device 50 has the meeting client software running on it, annotations 460 will appear on the interactive display surface 55 of the portable computing device 50 (see FIG. 30) as the guest user annotates on the interactive surface 24 of the interactive board 22. The client software will allow the guest user to save a copy of the opened file with ink annotations on the portable computing device 50. If the guest user is connected to the interactive board 22 during a scheduled meeting, the client meeting software on the portable computing device 50 will allow all remote participants to view the content of the guest user's file as displayed on the interactive board 22. If the guest user moves out of range of the interactive board 22 without giving a command to the interactive board 22 to end the meeting session, the client software on the portable computing device will save a copy of the annotated file on the portable computing device 50 before the user is out of range of the wireless network device on the interactive board 22. Once out of range, the client software will delete the guest user's file from the interactive board 22 and the client software will then delete itself from the portable computing device 50.

Although the wireless network device is described as being integrated into the interactive board 22, in an alternative embodiment, the wireless network device 60 is integrated into the collaboration computing device 28. In this embodiment, the operating system running on the collaboration computing device 28, such as for example, the Micorsoft Windows 7 operating system, splits the functionality of the network device to create a virtual access point 60 for portable computing devices 50 and a network adapter to connect the collaboration computing device 28 to the network 65.

Although in embodiments described above the interactive board 22 is described as utilizing an LCD device for displaying the images, those skilled in the art will appreciate that other types of interactive boards may be used. For example, a boom assembly that supports a short-throw projector such as that sold by SMART Technologies ULC of Calgary, Alberta under the name "SMART UX60", may be employed to project an image, such as for example, a computer desktop, onto the interactive surface 24.

Also, although the interactive board 22 of the collaboration site is described as employing machine vision to detect user interaction with the interactive surface 24, those of skill in the art will appreciate that the interactive board 22 may employ electromagnetic, capacitive, acoustic, analog resistive or other suitable technology to detect user interaction with the interactive surface.

Although embodiments have been described above with reference to the accompanying drawings, those of skill in the art will appreciate that variations and modifications may be made without departing from the scope thereof as defined by the appended claims.

What is claimed is:

1. An interactive board comprising an interactive display surface and an integrated wireless network device, said wireless network device configured to establish a wireless communication link with a proximate portable computing device and to provide portable computing device locator information to a networked device.

2. The interactive board of claim 1 wherein the wireless network device is a Wi-Fi network device.

3. The interactive board of claims 1 wherein the networked device is a server and wherein the location information comprises received signal strength data derived from wireless signals emitted by the portable computing device.

4. The interactive board of claim 3 wherein the locator information further comprises direction/orientation information received from the portable computing device.

5. The interactive board of claim 4 wherein the direction/orientation information is derived from output of a digital compass and accelerometer of said portable computing device.

* * * * *